UNITED STATES PATENT OFFICE.

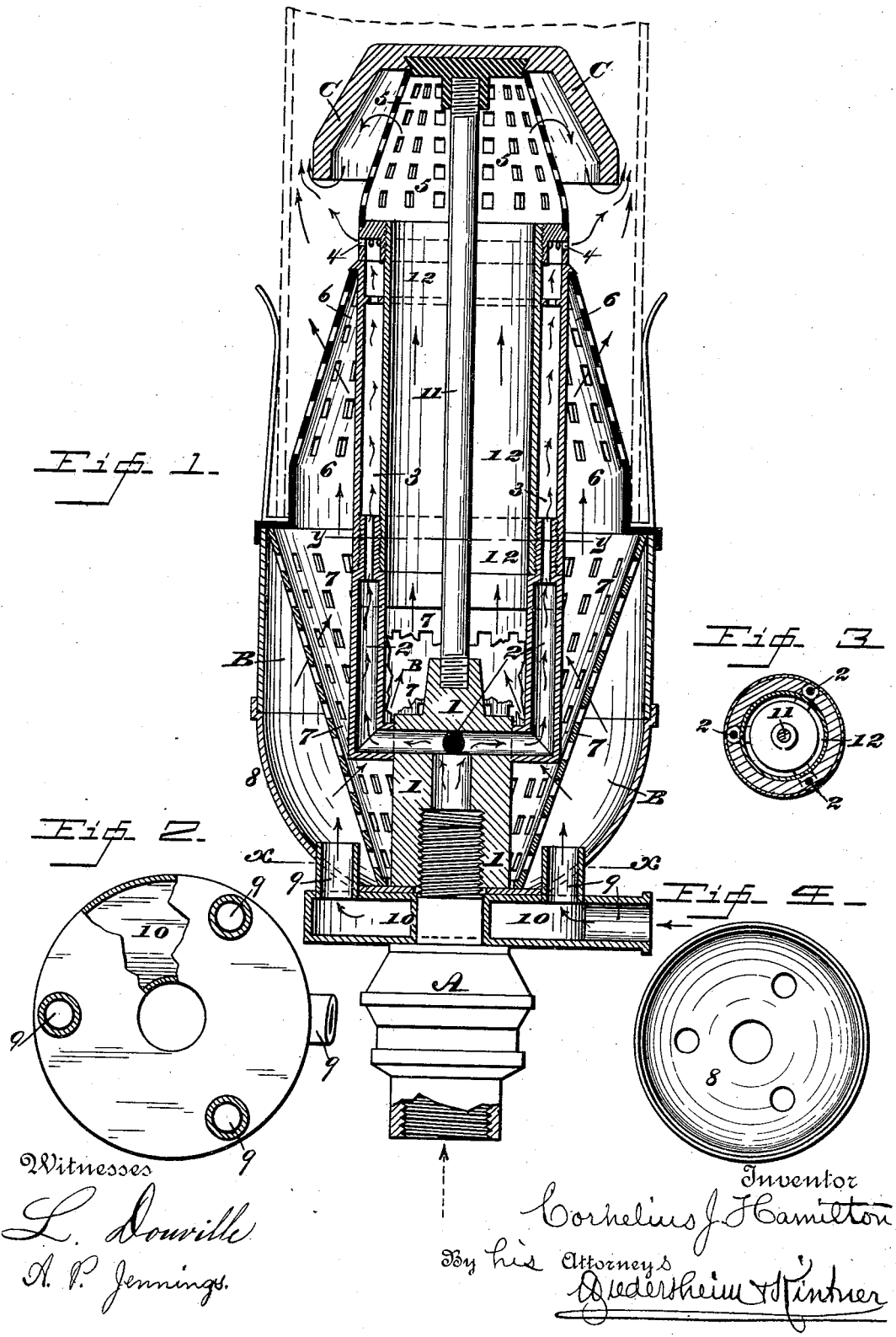

CORNELIUS J. HAMILTON, OF PHILADELPHIA, PENNSYLVANIA, ASSIGNOR TO JAMES H. WILSON, OF SAME PLACE.

GAS-BURNER.

SPECIFICATION forming part of Letters Patent No. 407,291, dated July 16, 1889.

Application filed July 28, 1888. Serial No. 281,287. (No model.)

*To all whom it may concern:*

Be it known that I, CORNELIUS J. HAMILTON, a citizen of the United States, residing in the city and county of Philadelphia, State of Pennsylvania, have invented a new and useful Improvement in Gas-Burners, which improvement is fully set forth in the following specification and accompanying drawings.

My invention consists of a gas-burner constructed substantially as hereinafter set forth, whereby a brilliant and steady flame is produced.

Figure 1 represents a central vertical section of a gas-burner embodying my invention. Fig. 2 represents a horizontal section on line $x$ $x$, Fig. 1. Fig 3 represents a horizontal section on line $y$ $y$, Fig. 1, on a reduced scale. Fig. 4 represents a top view of the bottom cup of the burner on a reduced scale.

Similar letters and numerals of reference indicate corresponding parts in the several figures.

Referring to the drawings, A represents a collar which may be screwed to a gas-pipe, and supports a hollow plug 1, which communicates with said collar and carries the gas-distributing pipes 2, the latter being connected with the gas-chamber 3, the top of which has outlets 4, where the flame is produced.

Above the chamber 3 is a perforated cap 5, and surrounding said chamber is a perforated cap 6, both caps being of conical form, the top of the cap 6 closing against the outer wall of said chamber.

Surrounding the pipes 2 is a perforated shell 7, or, as it may be more properly termed, an "air-distributer," which is of inverted conical form and has its lower end closing against the plug 1.

Encircling the air-distributer 7 is an inverted cup 8, which is imperforated and closes against the top and bottom of said air-distributer, forming an air-chamber B, which has air-supply pipes 9, which open into said chamber and are connected with an air-chamber 10, into which, if desired, air may be forced by a blower or other mechanical means.

On the top of the cap 5 is a conical deflector C, which is sustained by a rod 11, which is screwed or otherwise secured to the under side of said deflector, passed through the annular air-space 12 within the inner wall of the gas-chamber 3, and has its lower end screwed or otherwise secured to the top of the plug 1, all as clearly shown in Fig. 1.

It will be seen that when air enters the chamber B it passes through the perforated air-distributer 7, and some of the air is directed into the space 12 and escapes therefrom through the cap 5, whereby the interior of the flame is supplied with air. Some of the air escapes through the perforated cap 6, and so supplies the exterior of the flame. The air that escapes through the perforated cap 5 first impinges against the inner wall of the conical deflector C, and from thence reaches the flame, whereby should there be any irregularity in the currents of the escaping air the deflector against which the air impinges or impacts forms a chamber, so that the interior of the flame is supplied with air in an equable manner and highly-heated condition.

Owing to the imperforate shell or cup 8 around the perforated air-distributer 7, should there be puffs or blasts of air directed against the lower portion of the lamp, the same are prevented from reaching said air-distributer 7, whereby irregularities of supply of air to the chamber B are avoided and air is equably fed to the interior and exterior of the flame, thus steadying the same, while the large volume of air supplied causes the flame to be of a brilliant nature.

Having now described my invention, what I claim as new, and desire to secure by Letters Patent, is—

1. In a gas-lamp, the combination of a central supply-pipe with a series of distributing-pipes leading to an annular gas-chamber having outlets at the top thereof, the perforated conical cap 5 on said gas-chamber, the deflector C, secured to said cap, the air-distributer 7, surrounding said gas-distributing pipes, the inverted cup 8, surrounding said air-distributer and forming a chamber having openings leading into the lower part thereof, and the perforated cap 6, surrounding the gas-chamber and above the air-distributer 7, substantially as and for the purpose set forth.

2. In a gas-lamp, gas-supply pipes, a gas-chamber communicationg therewith having outlets, a perforated cap above the same, a perforated cap and an air-distributer surrounding the gas-supply pipes and gas-chamber, and an imperforate shell or guard surrounding said air-distributer, substantially as and for the purpose described.

3. In a gas-lamp, the combination of a central supply-pipe having a radiating series of distributing-pipes therefrom leading to an upper annular gas-chamber, the latter having openings at its top, the perforated cap 5 above said gas-chamber, the deflector C, secured to said cap, an air-distributer surrounding the distributing-pipes, and a perforated cap surrounding the gas-chamber below the top outlets thereof, the inverted cup 8, surrounding the air-distributer, and an air-chamber connected with the central supply-pipe and having pipes or tubes leading into the space between the cup 8 and the air-distributer 7, substantially as and for the purpose described.

4. In a gas-lamp, the combination of the collar A, the hollow plug 1, the air-chamber 10 on said collar, gas-supply pipes 2, leading from said hollow plug, annular gas-chamber 3 above said gas-supply pipe 2 and having outlets 4, a perforate air-distributer surrounding said gas-supply pipes, the imperforate shell 8, surrounding said air-distributer and forming the air-chamber B, the air-pipes 9, leading into the base of said chamber B from said air-chamber 10, a perforated cap surrounding said annular gas-chamber, air-space 12 within said gas-chamber, the perforated cap 5 above said gas-chamber 3 and air-space 12, and the conical deflector C, surrounding the said perforated cap 5, substantially as described.

The above specification of my invention signed by me in the presence of witnesses.

CORNELIUS J. HAMILTON.

Witnesses:
JOHN A. WIEDERSHEIM,
A. P. JENNINGS.